United States Patent [19]
Fukumura

[11] Patent Number: 5,556,210
[45] Date of Patent: Sep. 17, 1996

[54] WHEEL BEARING ASSEMBLY

[75] Inventor: Yoshikazu Fukumura, Iwata, Japan

[73] Assignee: NTN Corporation, Osaka, Japan

[21] Appl. No.: 455,483

[22] Filed: May 31, 1995

[30] Foreign Application Priority Data

May 31, 1994 [JP] Japan ................................. 6-118746
May 31, 1994 [JP] Japan ................................. 6-118793

[51] Int. Cl.⁶ .................................................. F16C 19/08
[52] U.S. Cl. ........................... 384/517; 384/544; 384/903
[58] Field of Search ..................................... 384/517, 544, 384/518, 903, 563, 589

[56] References Cited

U.S. PATENT DOCUMENTS

| | | | |
|---|---|---|---|
| 4,789,253 | 12/1988 | Perego | 384/517 |
| 5,226,737 | 7/1993 | Sandy | 384/544 |
| 5,492,417 | 2/1996 | Baker et al. | 384/544 |
| 5,507,094 | 4/1996 | Lederman | 384/544 |

*Primary Examiner*—Lenard A. Footland
*Attorney, Agent, or Firm*—Wenderoth, Lind & Ponack

[57] ABSTRACT

A bearing assembly for a vehicle wheel having a wheel driving ring having a flange for coupling a vehicle wheel at one end, a cylindrical knuckle supporting the wheel driving ring, a pair of counterbored outer rings mounted in the knuckle with their thicker ends facing each other, balls received in two rows of ball raceways formed on the counterbored outer rings and two rows of ball raceways formed in the outer periphery of the wheel driving ring, two diametrically divided spacers inserted between the pair of counterbored outer rings for keeping the balls preloaded, the knuckle having a flange provided on its inner periphery at one end thereof to prevent axial movement of the counterbored outer rings. A retaining ring is pressed against the inner periphery of the knuckle at the other end and at the same time pressed against the thinner end of one of the counterbored outer rings to axially urge the one of the counterbored rings.

23 Claims, 6 Drawing Sheets

WHEEL BEARING ASSEMBLY

BACKGROUND OF THE INVENTION

This invention relates to a wheel bearing assembly for supporting a driven wheel of an automobile.

FIG. 6 shows a conventional wheel bearing assembly of this type. It includes a homokinetic joint having an outer ring 42 formed with a plurality of ball grooves 41 in the inner surface thereof. The outer ring 42 integrally carries at its end a hub 44 having a flange 43 for supporting a vehicle wheel. The outer ring 42 and the hub cooperate to act as a wheel driving ring 40. The driving ring 40 is inserted in a cylindrical knuckle 45 fixed to the car body. A pair of counterbored outer rings 46 are disposed in the knuckle 45 with their thicker sides facing each other. Balls 47 in two rows are mounted between the respective outer rings 46 and the outer periphery of the driving ring 40 to rotatably support the driving ring 40.

The balls 47 are kept pre-loaded by means of two diametrically divided spacers 48 inserted between the opposite surfaces of the counterbored outer rings 46. The outer rings 46 and the spacers 48 are kept from coming off by a flange 49 protruding from the inner surface of the knuckle 45 at one end thereof, and a closure member 50 provided at the other end of the knuckle.

When assembling this wheel bearing assembly, the counterbored outer rings 46 are fitted onto the driving ring 40 first. Before mounting the knuckle 45 and the spacers 48, one row of balls 47 are set in position with the outer rings 46 moved axially to one side. Then, another row of balls 47 are set in position after moving the outer rings axially to the other side. In such a manner, it is possible to mount many balls. The wheel bearing assembly thus formed has a large load-bearing capacity.

As mentioned above, the counterbored outer rings 46 and the spacers 48 are kept from coming off by being sandwiched between the flange 49 formed at one end of the knuckle 45 and the closure member 50 provided at the other end of the knuckle 45. Because of this arrangement, this bearing assembly has the following problems.

Namely, the thickness of the spacers 48 disposed between the counterbored outer rings 46 varies according to the pre-load applied to the balls 47. Thus, the distance between the outer remote ends of the counterbored outer rings 46 also varies. If this distance is smaller than the distance between the inner opposite surfaces of the flange 49 of the knuckle 45 and the closure member 50, the flange 49 and the closure member 50 cannot prevent axial movement of the counterbored outer rings 46 and the spacers 48 any longer.

On the other hand, if the distance is larger than the latter distance, a gap will be formed between the knuckle 45 and the closure member 50, through which dust can easily penetrate into the bearing assembly.

An object of this invention is to provide a wheel bearing assembly which can completely prevent axial movement of the spacers for pre-loading the balls and the counterbored outer rings for guiding the balls.

SUMMARY OF THE INVENTION

According to the present invention, there is provided a bearing assembly for a vehicle wheel comprising a wheel driving ring having a flange for coupling a vehicle wheel at one end thereof, a cylindrical knuckle supporting the wheel driving ring, a pair of counterbored outer rings mounted in the knuckle with their thicker ends facing each other, balls received in two rows of ball raceways formed on the respective counterbored outer rings and two rows of ball raceways formed in the outer periphery of the wheel driving ring, two diametrically divided spacers inserted between the pair of counterbored outer rings for keeping the balls pre-loaded, the knuckle having a flange provided on its inner periphery at one end thereof to prevent axial movement of the counterbored outer rings, characterized in that a retaining ring is pressed against the inner periphery of the knuckle at the other end of the knuckle and at the same time pressed against the thinner end of one of the counterbored outer rings to axially urge the one of the counterbored rings.

The retaining ring may be press-fitted on the inner surface of the knuckle. Also, it may be in the form of a partially cut-away shrinkable resilient ring fitted in a ring groove formed in the inner periphery of the knuckle so as to be pressed against the outer side wall of the ring groove.

Since the retaining ring is pressed against the thinner end of one of the counterbored outer rings to axially urge the outer ring, and at the same time pressed against the inner periphery of the knuckle, the counterbored outer rings and the spacers are prevented from moving axially by the retaining ring and the flange of the knuckle.

The knuckle may be formed by deep drawing.

Other features and objects of the present invention will become apparent from the following description made with reference to the accompanying drawings, in which:

DETAILED DESCRIPTION OF THE PREFERRED EMBODIMENT

Embodiments of the present invention are now described with reference to FIGS. 1–5.

Figure 1:
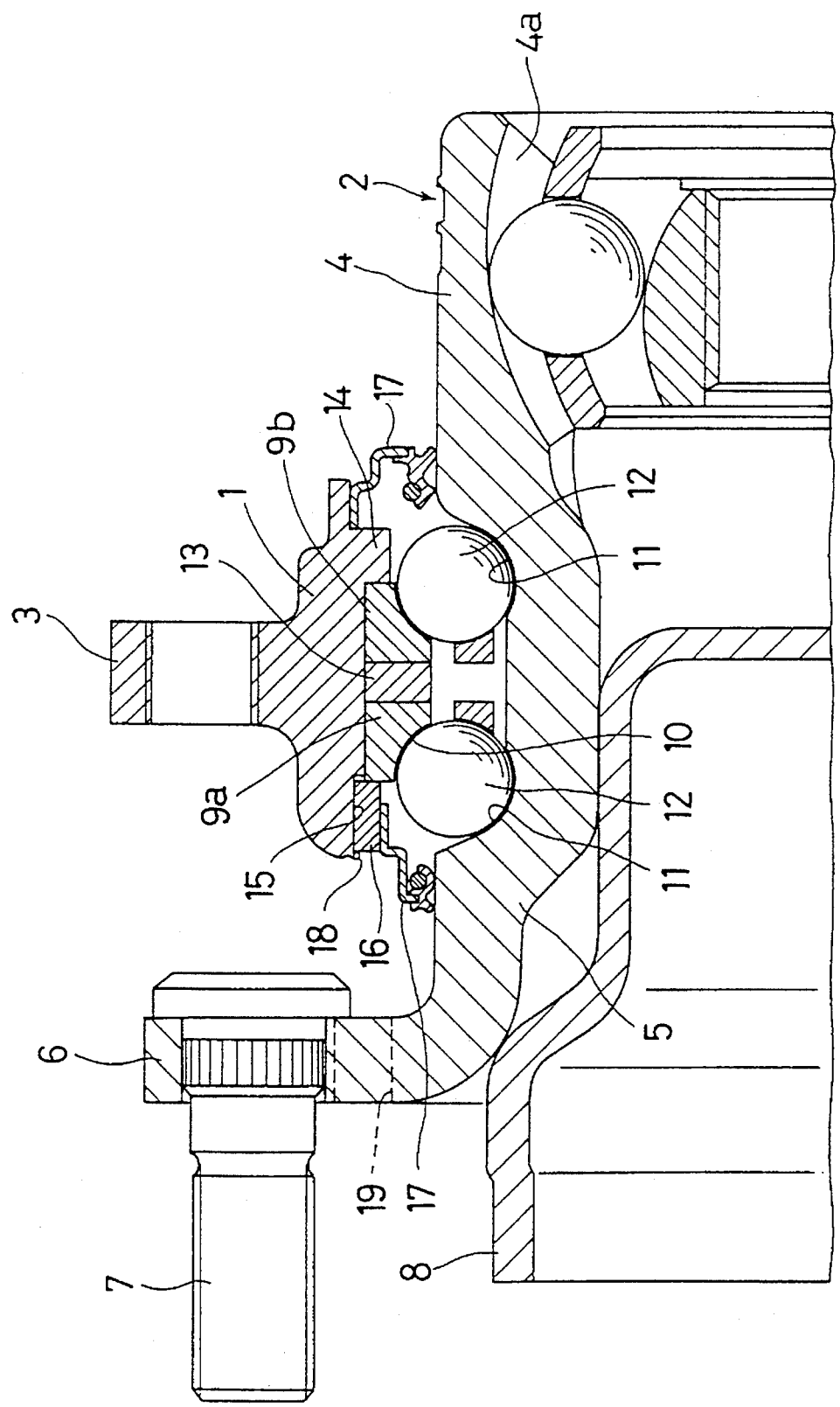
FIG. 1 is a sectional view of one embodiment of the wheel bearing assembly according to this invention.

FIG. 1 shows the first embodiment of the wheel bearing assembly according to this invention. It has a cylindrical knuckle 1, and a driving ring 2 inserted in the knuckle 1. The knuckle 1 has a flange 3 adapted to be fixed to a car body.

A wheel driving ring 2 comprises an outer ring 4 of a homokinetic joint having a plurality of ball grooves 4a in its inner surface, and a hub 5 integral with one end of the outer ring 4.

A flange 6 is formed on the outer periphery of the hub 5 at its end. It carries a wheel mounting bolt 7. A cap 8 is press-fitted into an end opening of the hub 5 to close the opening.

A pair of counterbored outer rings 9a and 9b are mounted in the knuckle 1 with their thick ends facing each other. Balls 12 are received in ball raceways 10 formed on the inner surfaces of the counterbored outer rings 9a, 9b and two rows of ball raceways 11 formed in the outer surface of the driving ring 2.

The two rows of balls 12 are pre-loaded by means of two diametrically divided spacers 13 which are thrust into between the outer rings 9a, 9b from their diametrically outer side.

A flange 14 is formed on the inner periphery of the knuckle 1 at one end thereof. A ring engaging hole 15 is formed in its inner periphery at the other end.

A retaining ring 16 is press-fitted in the ring engaging hole 15 so that its one end is pressed against the thin end of the outer ring 9a, thus urging the outer ring 9a axially to press the other outer ring 9b against the flange 14.

Numerals 17 indicate seal members for closing openings at both ends of the knuckle 1.

By press-fitting the retaining ring 16 in the ring engaging hole 15 so that its one end is pressed against the thin end of one of the outer rings 9a, thus urging the outer ring 9a axially to press the other outer ring 9b against the flange 14, it is possible to completely eliminate any axial movement of the counterbored outer rings 9a, 9b and the spacers 13, irrespective of the thickness of the spacers 13, i.e. the distance between the outer remote ends of the counterbored outer rings 9a, 9b.

The knuckle 1 has a caulked rib 18 provided along the edge of its opening at the other end thereof to engage the outer end of the retaining ring 16, thereby preventing the ring 16 from coming out of the hole 15. With this arrangement, it is possible to more positively prevent axial movement of the counterbored rings 9a, 9b and the spacers 13.

A plurality of holes 19 may be formed in the flange 6 of the hub 5 to facilitate the work of press-fitting the retaining ring 16 and/or forming the caulked rib 18.

Figure 2:
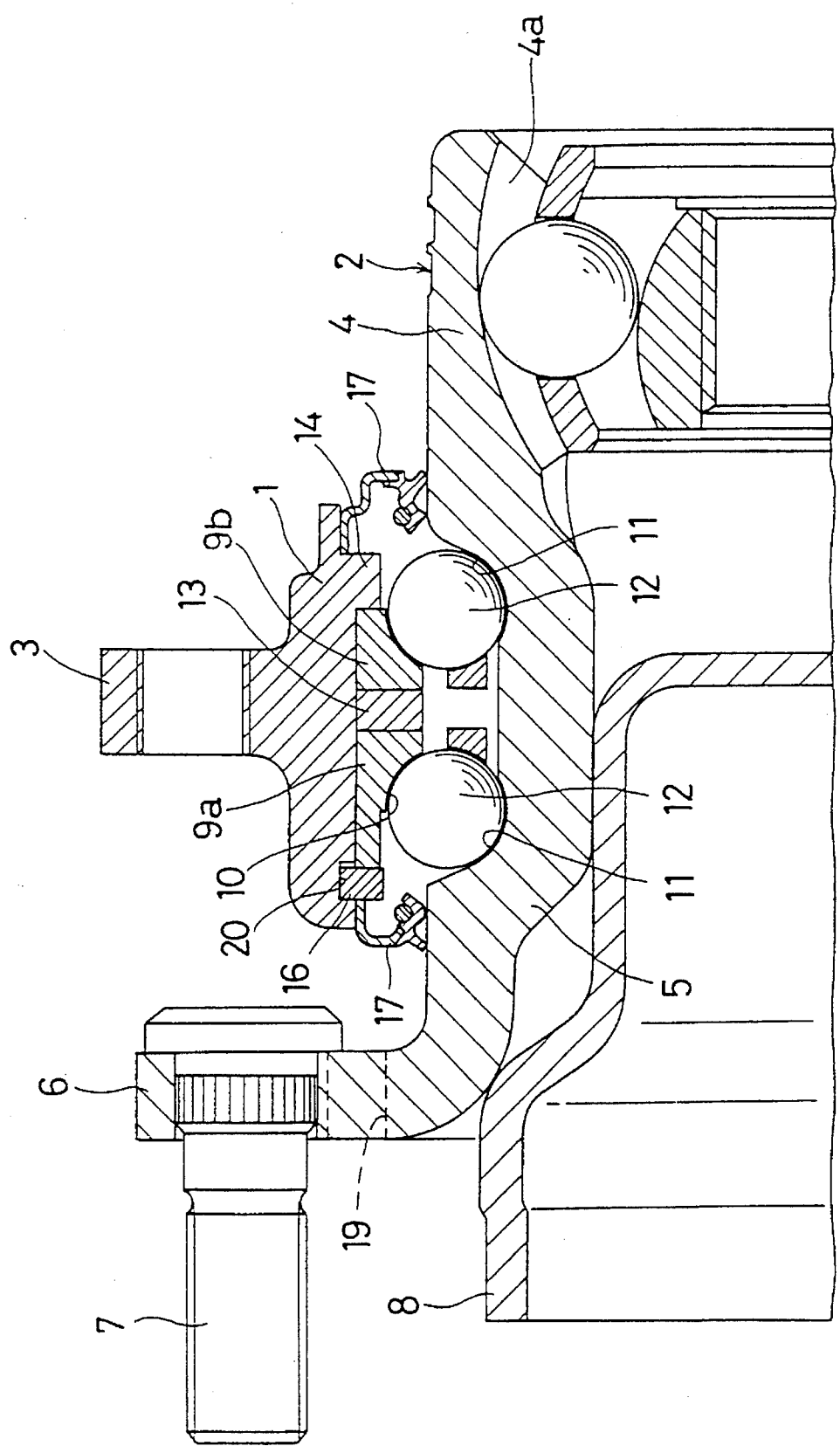
FIGS. 2–5 are sectional views of other embodiments of the invention.

FIG. 2 shows another embodiment. The retaining ring 16 of this embodiment is a partially cut-apart shrinkable resilient ring received in a ring groove 20 formed in the inner periphery of the knuckle 1 at the other end thereof. It has one side thereof pressed against the outer ring 9a and the other side against the side wall of the ring groove 20, thereby preventing axial movement of the counterbored outer rings 9a, 9b and the spacers 13.

The retaining ring 16 to be fitted in the ring groove 20 is selected from a plurality of ring members having different thicknesses according to the distance between the outer remote ends of the counterbored outer rings 9a and 9b.

But if such ring members are all of the same thickness, it is necessary to adjust the thickness of the retaining ring 16 according to the abovesaid distance so that the counterbored outer ring 9a is urged axially by the ring 16 mounted in the ring groove 20. The thickness of the ring 16 may be adjusted e.g. by grinding it.

Figure 3:
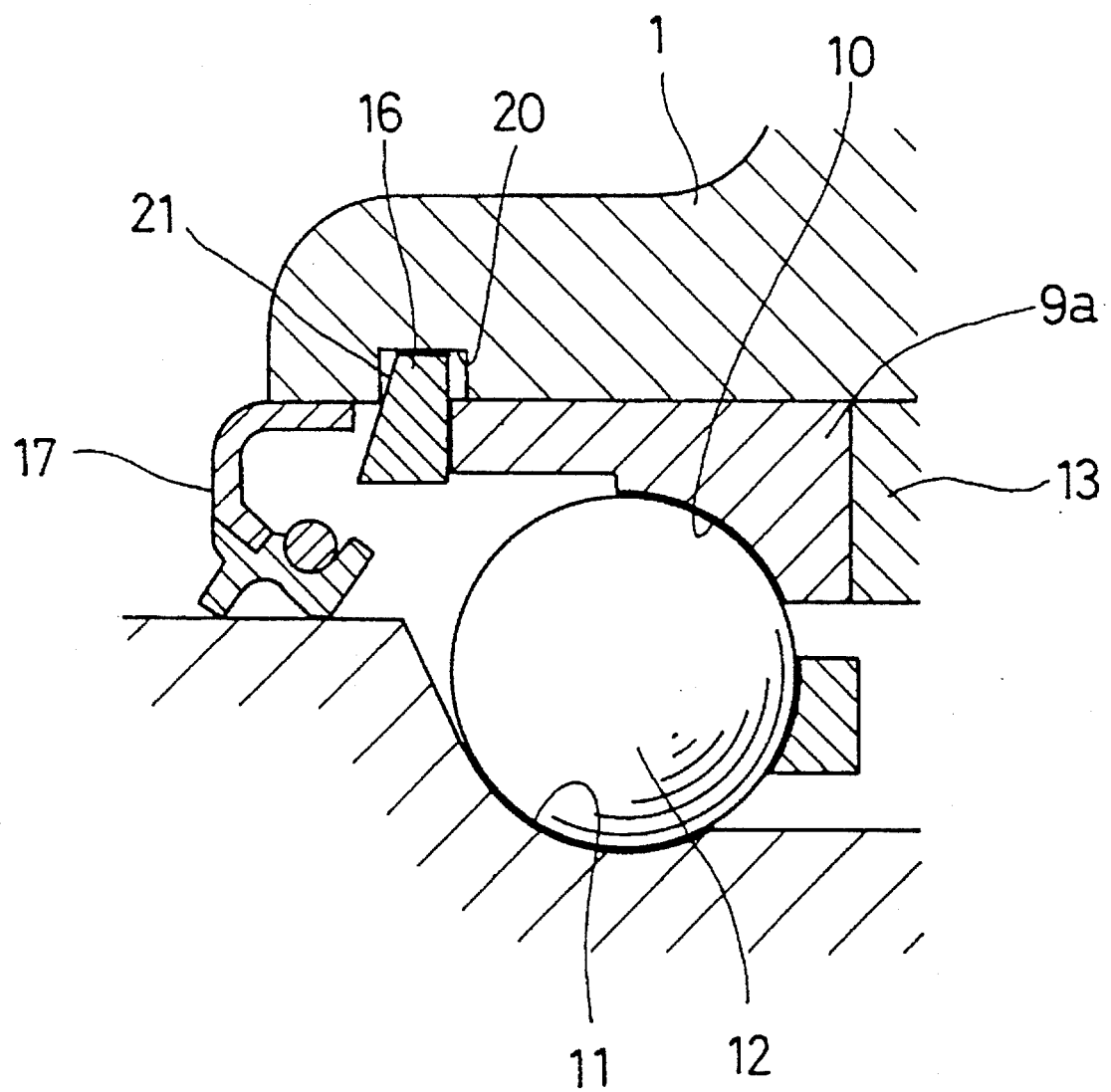

As shown in FIG. 3, the retaining ring 16 may have its outer side tapered as at 21 so that even if the thickness of the spacers 13 changes, the retaining ring 16 can axially urge the counterbored outer ring 9a with a constant force by sliding into or out of the ring groove 20 like a wedge.

Figure 4:
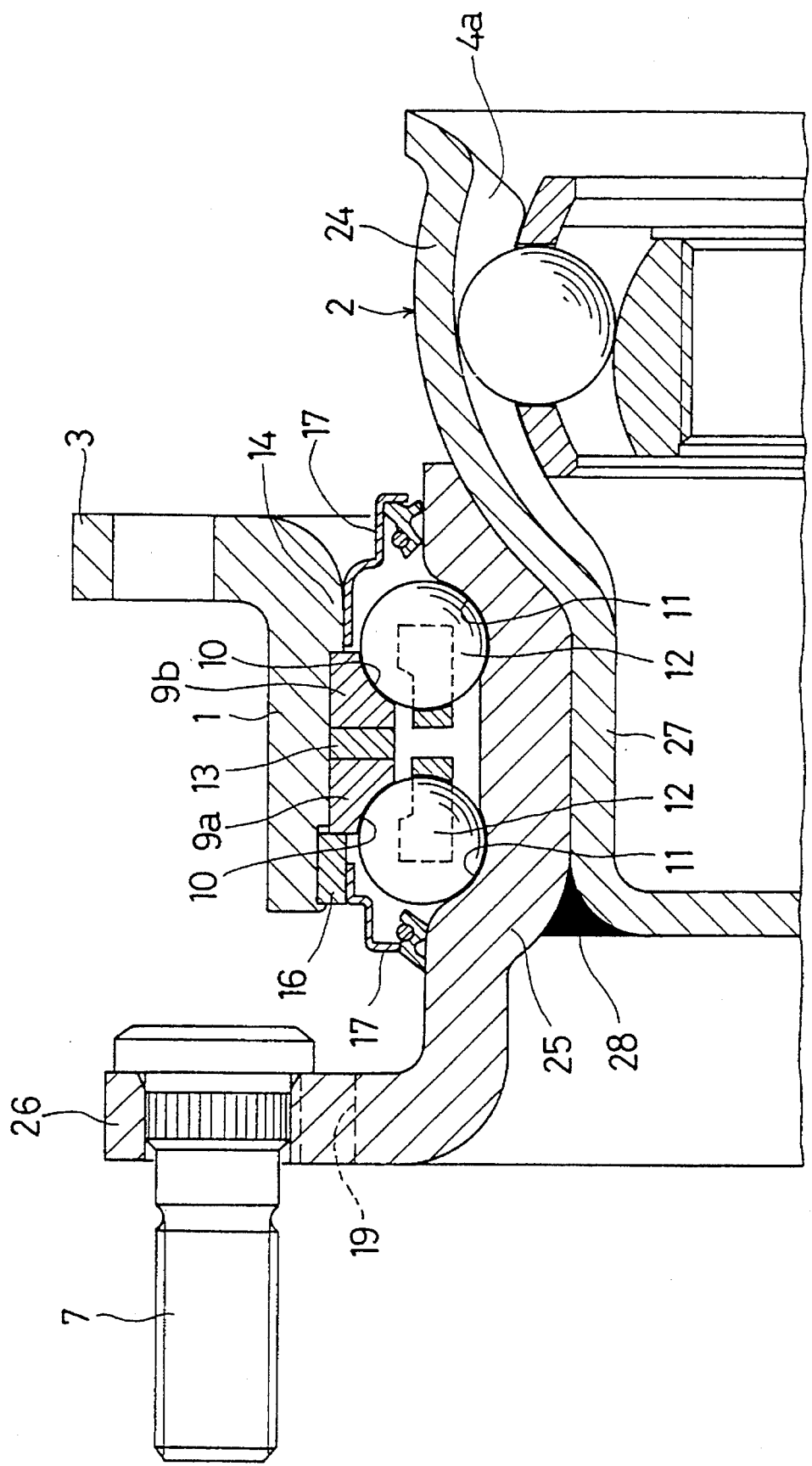

FIG. 4 shows another embodiment. The wheel driving ring 2 of this embodiment comprises an outer ring 24 of a homokinetic joint formed with a plurality of ball grooves 4a in its inner periphery, and a cylindrical hub 25 having a flange 26. The outer ring 24 has at one end thereof an integral shaft portion 27 on which is press-fitted the hub 25. The hub 25 and shaft portion 27 of the outer ring 24 are welded together at 28.

The outer ring 24 and the hub 25 are formed by deep drawing. The knuckle 1 for supporting a driving ring 2 is also formed by deep drawing.

The hub 25 has to have such a high strength that it can not only bear the weight of the car body but also withstand violent motions of the car, such as pitching, yawing and rolling.

Especially if this bearing assembly is mounted on a front-wheel drive car or a four-wheel drive car, it will be subjected to a very large cornering force while the car is turning a corner. The hub 25 has to be capable of withstanding such force.

On the other hand, the outer ring 24 of the homokinetic joint is used simply to transmit torque. Thus, it does not have to have so high a durability as the hub 25.

In order for the hub 25 to have a required durability, it has to have a sufficiently large wall thickness. Thus, in this embodiment, the hub has a wall thickness of about 8 mm.

The outer ring 24 does not have to have so large a wall thickness. Thus, in the embodiment, it has a wall thickness of about 3 mm.

Otherwise, this embodiment is the same as the embodiment shown in FIG. 1. Thus, we denote like elements by like numerals and omit their description.

By forming the outer ring 24 of the homokinetic joint and the hub 25 by deep drawing so that the former has a substantially smaller wall thickness than the latter, it is possible to significantly reduce the total weight of the rotating member comprising the outer ring 24 and the hub 25 and thus to reduce the inertia moment while the vehicle wheels are rotating.

By press-fitting the hub 25 onto the shaft portion 27 of the outer ring 24, torque can be transmitted therebetween even through their joint area, so that the load on the weld portion 28 is small. Thus, it is possible to eliminate the possibility of breakage of the weld portion 28. Since the outer ring 24 and the hub 25 are welded together at one end of their joint area, it is possible to positively prevent relative axial movement of the outer ring 24 and the hub 25.

The outer ring 24 and the hub 25 may be welded together at the leading edge of the hub 25.

Figure 5:
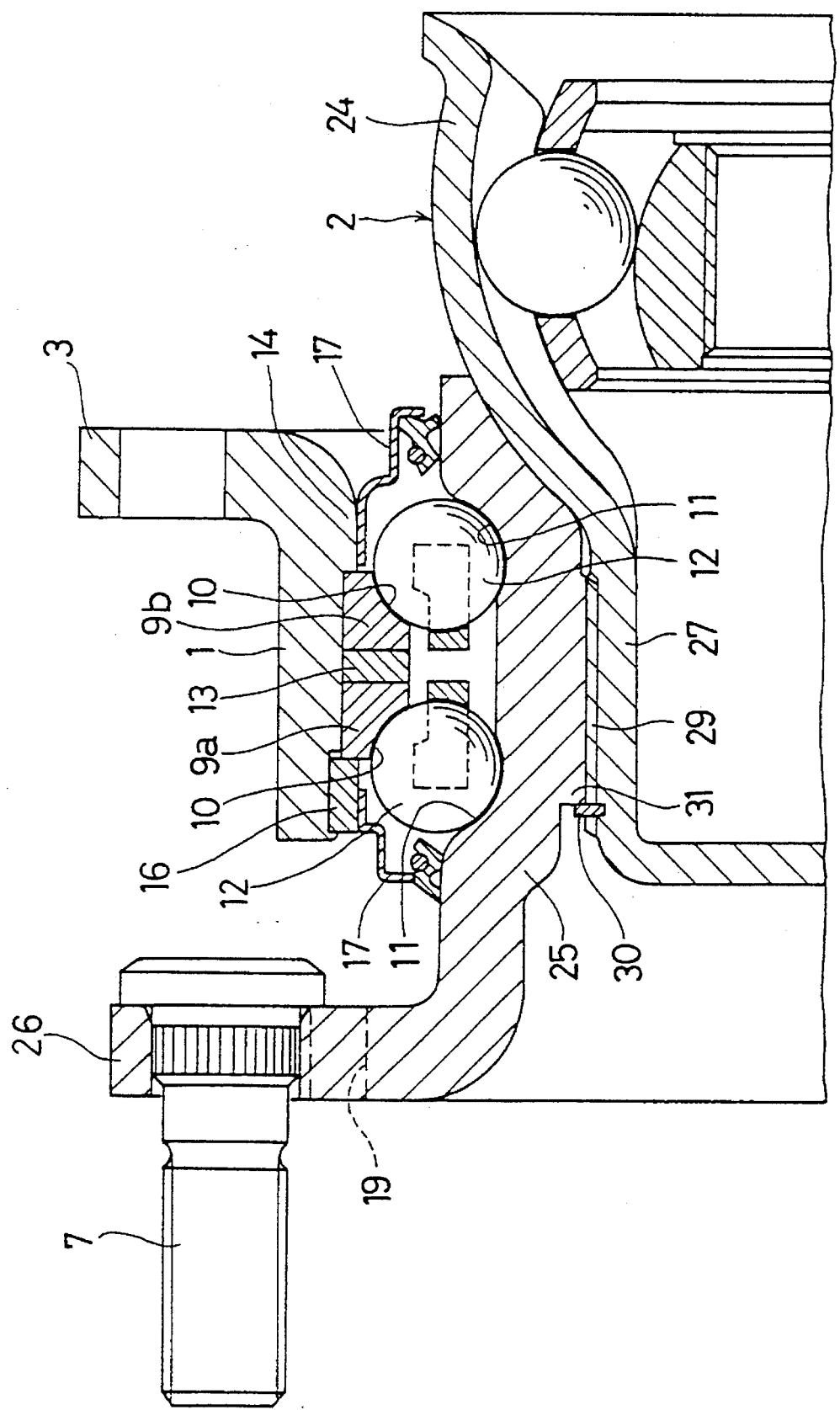
Figure 6:
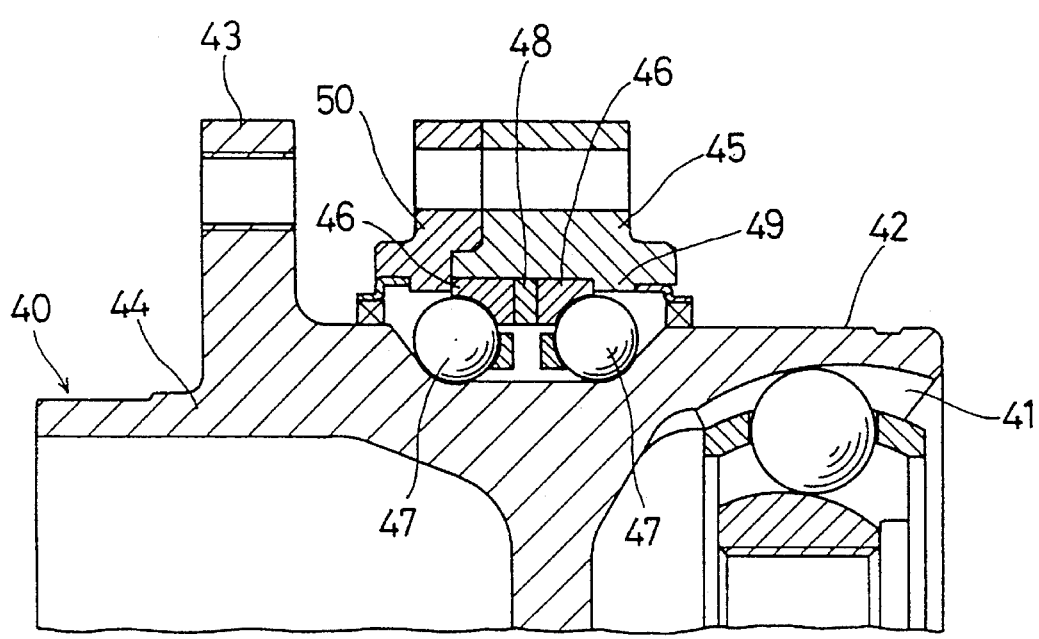
FIG. 6 is a sectional view of a conventional wheel bearing assembly.

In the embodiment shown in FIG. 5, the outer ring 24 and the hub 25 are coupled together through serrations 29 formed on their joint surfaces with a predetermined interference.

A retaining ring 30 is put on the shaft portion 27 of the outer ring 24 at its end. It engages a shoulder 31 formed on the inner periphery of the hub 25 to prevent relative axial movement between the outer ring 24 and the hub 25.

Otherwise, this embodiment is the same as the embodiment shown in FIG. 1. Thus, like elements are denoted by like numerals and their description is omitted.

In this embodiment, since the shaft portion 27 and the hub 25 are coupled together through the serrations 29 meshing with each other, torque can be positively transmitted between the outer ring 24 and the hub 25.

With the arrangement of the present invention, axial movement of the counterbored outer rings and the spacers is completely prevented by the retaining ring.

The retaining ring can be easily mounted by press-fitting.

Because the knuckle has a caulked rib provided along an edge of an opening of the knuckle, the retaining ring is prevented from coming off, so that the counterbored outer rings and the spacers are securely retained in position by the retaining ring.

By using a retaining ring in the form of a partially cut-away shrinkable ring and forming the outer side face of the retaining ring as a tapered surface, the retaining ring acts like a wedge to urge the outer rings axially even though spacers with different thicknesses are used.

By forming the wheel driving ring having the outer ring and the hub by deep drawing, the manufacturing cost can be reduced.

What is claimed is:

1. A bearing assembly for a vehicle wheel comprising a wheel driving ring having a flange for coupling a vehicle wheel at one end thereof, a cylindrical knuckle supporting said wheel driving ring, a pair of counterbored outer rings mounted in said knuckle with their thicker ends facing each other, balls received in two rows of ball raceways formed on said respective counterbored outer rings and two rows of ball raceways formed in the outer periphery of said wheel driving ring, two diametrically divided spacers inserted between said pair of counterbored outer rings for keeping said balls pre-loaded, said knuckle having a flange provided on its inner periphery at one end thereof to prevent axial movement of said counterbored outer rings, characterized in that a retaining ring is pressed against the inner periphery of said knuckle at the other end thereof and at the same time pressed against the thinner end of one of said counterbored outer rings to axially urge said one of said counterbored rings.

2. A bearing assembly for a vehicle wheel as claimed in claim 1 wherein said retaining ring is press-fitted in said knuckle.

3. A bearing assembly for a vehicle wheel as claimed in claim 2 wherein said knuckle has a caulked rib provided along an edge of an opening of said knuckle at said other end of said knuckle, so as to engage an end face of said retaining ring.

4. A bearing assembly for a vehicle wheel as claimed in claim 3 wherein said wheel driving ring has a flange formed with a plurality of holes used to mount said retaining ring.

5. A bearing assembly for a vehicle wheel as claimed in claim 3 wherein said wheel driving ring comprises an outer ring of a homokinetic joint and a hub integrally joined to said outer ring and having a flange.

6. A bearing assembly for a vehicle wheel as claimed in claim 3 wherein said wheel driving ring comprises an outer ring of a homokinetic joint having a shaft portion at one end thereof, and a hub having a flange and coupled to said shaft portion of said outer ring, wherein said outer ring and said hub are members formed by deep drawing, and wherein said outer ring has a smaller wall thickness than said hub.

7. A bearing assembly for a vehicle wheel as claimed in claim 2 wherein said wheel driving ring has a flange formed with a plurality of holes used to mount said retaining ring.

8. A bearing assembly for a vehicle wheel as claimed in claim 2 wherein said wheel driving ring comprises an outer ring of a homokinetic joint and a hub integrally joined to said outer ring and having a flange.

9. A bearing assembly for a vehicle wheel as claimed in claim 2 wherein said wheel driving ring comprises an outer ring of a homokinetic joint having a shaft portion at one end thereof, and a hub having a flange and coupled to said shaft portion of said outer ring, wherein said outer ring and said hub are members formed by deep drawing, and wherein said outer ring has a smaller wall thickness than said hub.

10. A bearing assembly for a vehicle wheel as claimed in claim 1 wherein said retaining ring is a partially cut-apart shrinkable resilient ring received in a ring groove formed in the inner periphery of said knuckle so as to be pressed against the outer side wall of said ring groove.

11. A bearing assembly for a vehicle wheel as claimed in claim 10 wherein said resilient ring has its outer side face tapered.

12. A bearing assembly for a vehicle wheel as claimed in claim 11 wherein said wheel driving ring has a flange formed with a plurality of holes used to mount said retaining ring.

13. A bearing assembly for a vehicle wheel as claimed in claim 11 wherein said wheel driving ring comprises an outer ring of a homokinetic joint and a hub integrally joined to said outer ring and having a flange.

14. A bearing assembly for a vehicle wheel as claimed in claim 11 wherein said wheel driving ring comprises an outer ring of a homokinetic joint having a shaft portion at one end thereof, and a hub having a flange and coupled to said shaft portion of said outer ring, wherein said outer ring and said hub are members formed by deep drawing, and wherein said outer ring has a smaller wall thickness than said hub.

15. A bearing assembly for a vehicle wheel as claimed in claim 10 wherein said wheel driving ring has a flange formed with a plurality of holes used to mount said retaining ring.

16. A bearing assembly for a vehicle wheel as claimed in claim 10 wherein said wheel driving ring comprises an outer ring of a homokinetic joint and a hub integrally joined to said outer ring and having a flange.

17. A bearing assembly for a vehicle wheel as claimed in claim 10 wherein said wheel driving ring comprises an outer ring of a homokinetic joint having a shaft portion at one end thereof, and a hub having a flange and coupled to said shaft portion of said outer ring, wherein said outer ring and said hub are members formed by deep drawing, and wherein said outer ring has a smaller wall thickness than said hub.

18. A bearing assembly for a vehicle wheel as claimed in claim 1 wherein said wheel driving ring has a flange formed with a plurality of holes used to mount said retaining ring.

19. A bearing assembly for a vehicle wheel as claimed in claim 18 wherein said wheel driving ring comprises an outer ring of a homokinetic joint and a hub integrally joined to said outer ring and having a flange.

20. A bearing assembly for a vehicle wheel as claimed in claim 18 wherein said wheel driving ring comprises an outer ring of a homokinetic joint having a shaft portion at one end thereof, and a hub having a flange and coupled to said shaft portion of said outer ring, wherein said outer ring and said hub are members formed by deep drawing, and wherein said outer ring has a smaller wall thickness than said hub.

21. A bearing assembly for a vehicle wheel as claimed in claim 1 wherein said wheel driving ring comprises an outer ring of a homokinetic joint and a hub integrally joined to said outer ring and having a flange.

22. A bearing assembly for a vehicle wheel as claimed in claim 1 wherein said wheel driving ring comprises an outer ring of a homokinetic joint having a shaft portion at one end thereof, and a hub having a flange and coupled to said shaft portion of said outer ring, wherein said outer ring and said hub are members formed by deep drawing, and wherein said outer ring has a smaller wall thickness than said hub.

23. A bearing assembly for a vehicle wheel as claimed in claim 22 wherein said knuckle is formed by deep drawing.

* * * * *